United States Patent
Tai et al.

(10) Patent No.: US 10,733,107 B2
(45) Date of Patent: Aug. 4, 2020

(54) NON-VOLATILE MEMORY APPARATUS AND ADDRESS CLASSIFICATION METHOD THEREOF

(71) Applicant: VIA Technologies, Inc., New Taipei (TW)

(72) Inventors: Ying-Yu Tai, Mountain View, CA (US); Jiangli Zhu, San Jose, CA (US); Jiin Lai, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 232 days.

(21) Appl. No.: 15/287,743

(22) Filed: Oct. 7, 2016

(65) Prior Publication Data

US 2018/0101314 A1    Apr. 12, 2018

(51) Int. Cl.
*G06F 12/10* (2016.01)
*G06F 12/1009* (2016.01)
*G06F 3/06* (2006.01)
*G06F 12/02* (2006.01)

(52) U.S. Cl.
CPC .......... *G06F 12/1009* (2013.01); *G06F 3/064* (2013.01); *G06F 3/0616* (2013.01);
(Continued)

(58) Field of Classification Search
CPC .. G06F 12/0246; G06F 12/1009; G06F 3/061; G06F 2212/7201; G06F 12/123; G06F 2212/7205; G06F 12/122
See application file for complete search history.

(56) References Cited

U.S. PATENT DOCUMENTS

2014/0328127 A1   11/2014  Tai
2016/0011979 A1   1/2016   Islam et al.
(Continued)

FOREIGN PATENT DOCUMENTS

CN    102902628    1/2013
CN    103455283    12/2013
(Continued)

OTHER PUBLICATIONS

"Office Action of Taiwan Counterpart Application", dated Oct. 26, 2017, p. 1-p. 9.
(Continued)

*Primary Examiner* — Reginald G Bragdon
*Assistant Examiner* — Thanh D Vo
(74) *Attorney, Agent, or Firm* — JCIRPNET (57) ABSTRACT

A non-volatile memory (NVM) apparatus and an address classification method thereof are provided. The NVM apparatus includes a NVM and a controller. The controller accesses the NVM in accordance with a write command of a host. The controller may perform the address classification method. The address classification method includes: providing a data look-up table, wherein the data look-up table includes a plurality of data entries, each of the data entries includes a logical address information, a counter value and a timer value; searching the data look-up table based on the logical address of the write command in order to obtain a corresponding counter value and a corresponding timer value; and determining whether the logical address of the write command is a hot data address based on the corresponding counter value and the corresponding timer value.

22 Claims, 5 Drawing Sheets

(52) U.S. Cl.
CPC ........ *G06F 3/0679* (2013.01); *G06F 12/0246* (2013.01); *G06F 2212/1032* (2013.01); *G06F 2212/1036* (2013.01); *G06F 2212/7201* (2013.01); *G06F 2212/7205* (2013.01); *G06F 2212/7211* (2013.01)

(56) References Cited

U.S. PATENT DOCUMENTS

| | | | |
|---|---|---|---|
| 2017/0024326 A1* | 1/2017 | Luo | G06F 12/1009 |
| 2018/0067850 A1* | 3/2018 | Kawamura | G06F 12/00 |
| 2018/0108404 A1* | 4/2018 | Miura | G06F 12/02 |

FOREIGN PATENT DOCUMENTS

| | | |
|---|---|---|
| CN | 103631538 | 3/2014 |
| CN | 103699492 | 4/2014 |
| CN | 103810113 | 5/2014 |
| CN | 104133774 | 11/2014 |
| CN | 104731717 | 6/2015 |
| CN | 105556485 | 5/2016 |
| TW | 201413451 | 4/2014 |
| WO | 2016135955 | 9/2016 |

OTHER PUBLICATIONS

"Office Action of Taiwan Counterpart Application," dated Feb. 12, 2018, p. 1-p. 10.
"Office Action of China Counterpart Application," dated Apr. 19, 2019, p. 1-p. 10.

\* cited by examiner

NON-VOLATILE MEMORY APPARATUS AND ADDRESS CLASSIFICATION METHOD THEREOF

BACKGROUND OF THE INVENTION

Field of the Invention

The invention relates to a memory apparatus, and particularly relates to a non-volatile memory apparatus and an address classification method thereof.

Description of Related Art

Compared with conventional hard disk drives, since a flash memory storage device has good read/write performance and has low power consumption, the flash memory is widely used in data storage systems. However, a key factor of writing data into the flash memory is write amplification (WA). The write application influences performance and durability of the flash memory. When a host sends a write command/instruction to the flash memory storage device, the flash memory storage device transforms (or decodes) the write command/instruction of the host into a plurality of internal write commands/instructions. The so-called operation of "transforming one host write command/instruction into a plurality of internal write commands/instructions is the write amplification. The write amplification is mainly used for an internal write operation, for example, garbage collection, wear levelling and/or other management write operations, so as to manage data update and storage endurance.

The write amplification also depends on write workloads. In an actual write workload, some data is updated more frequently. The frequently updated data is generally referred to as hot data. Updating of other data is probably less frequent. The less frequently updated data is generally referred to as cold data. To write the cold data and the hot data into a same memory in mixture may generally result in higher write amplification. Therefore, before the data of the host is written into the flash memory, there is a need for the flash memory storage device to identify whether the data of the host is hot data.

SUMMARY OF THE INVENTION

The invention is directed to a non-volatile memory apparatus and an address classification method thereof, which are adapted to identify whether a logical address of a write command coming from the host is a hot data address.

An embodiment of the invention provides a non-volatile memory apparatus including a non-volatile memory and a controller. The controller is coupled to the non-volatile memory. The controller is adapted to perform an address classification method to determine whether a logical address of a write command coming from a host is a hot data address. The controller accesses the non-volatile memory according to the write command of the host. The address classification method includes: providing a data look-up table, where the data look-up table includes a plurality of data entries, each of the data entries includes a logical address information, a counter value and a timer value; searching the data look-up table on the logical address of the write command in order to obtain a corresponding counter value and a corresponding timer value; and determining whether the logical address of the write command is the hot data address based on the corresponding counter value and the corresponding timer value.

An embodiment of the invention provides an address classification method of a non-volatile memory apparatus to determine whether a logical address of a write command coming from a host is a hot data address. The address classification method includes: providing a data look-up table, where the data look-up table includes a plurality of data entries, each of the data entries includes a logical address information, a counter value and a timer value; searching the data look-up table by a controller based on the logical address of the write command in order to obtain a corresponding counter value and a corresponding timer value; and determining whether the logical address of the write command is a hot data address by the controller based on the corresponding counter value and the corresponding timer value.

According to the above description, the non-volatile memory apparatus and the address classification method thereof provided by the embodiments of the invention adopt a data look-up table, where the data look-up table includes a plurality of data entries, and each of the data entries includes a logical address information, a counter value and a timer value. The corresponding counter value and the corresponding timer value can be searched from the data look-up table based on the logical address of the write command. The controller may check the corresponding counter value and the corresponding timer value to determining whether the logical address of the write command is a hot data address.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A term "couple (or connect)" used in the full text of the disclosure (including the claims) refers to any direct and indirect connections. For example, if a first device is described to be coupled (or connected) to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

Figure 1:
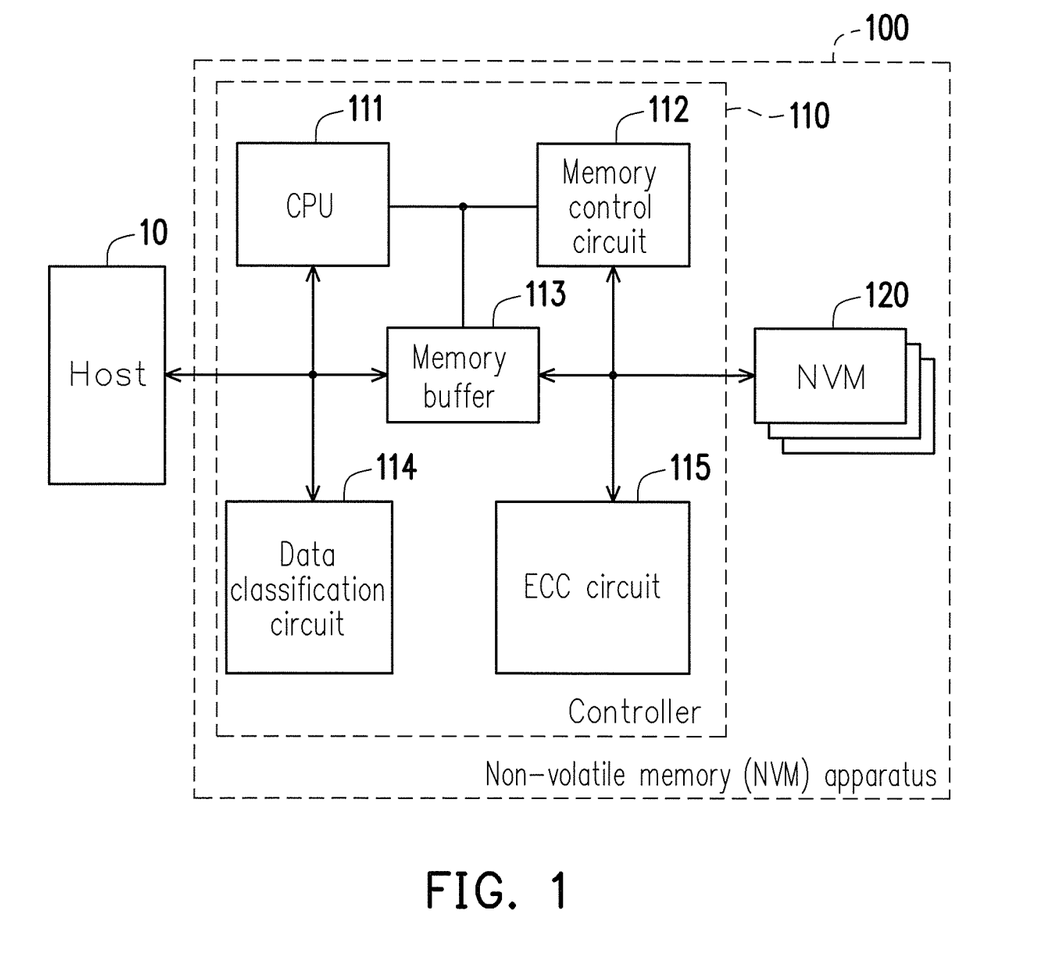
FIG. 1 is a circuit block schematic diagram of a non-volatile memory (NVM) apparatus 100 according to an embodiment of the invention.

FIG. 1 is a circuit block schematic diagram of a non-volatile memory (NVM) apparatus 100 according to an embodiment of the invention. According to a design requirement, the NVM apparatus 100 can be a flash drive, a solid state disc (SSD) or other storage device. The NVM 100 can be coupled to a host 10. The host 10 can be a computer, a mobile phone, a multimedia player, a camera or other electronic apparatus. The NVM apparatus 100 includes a controller 110 and a NVM 120. According to the design requirement, the NVM 120 can be a NAND flash memory or other non-volatile storage circuit/device.

The controller 110 is coupled to the NVM 120. The controller 110 may access the NVM 120 according to a write command of the host 10. When the host 10 sends a write command to the NVM apparatus 100, the controller 110 may execute an "address classification method" to determine whether a logical address of the write command coming from the host 10 is a hot data address. The so-called "hot data" refers to data that is very likely to be modified in the near future. After the logical address of the write command is determined to be the hot data address (or not the hot data address), the controller 110 may write the data of the host 10 into the NVM 120 according to the determination result and the logical address of the write command. During a process of writing the data into the NVM 120, since "whether the written data is the hot data" has been considered, the write amplification (WA) can be effectively reduced. For example, the cold data and the hot data are respectively written into different memory blocks of the NVM 120 based on determination of the hot data address, so that efficiency of a garbage collection operation can be improved. In other words, the "address classification method" executed by the controller 110 can also be regarded as a "(cold) hot data identification method", and the controller 110 may identify whether the data to be written by the host 10 is (cold) hot data according to the logical address of the write command sent by the host 10, and perform corresponding processing.

In the embodiment of the invention, the controller 110 includes a central processing unit (CPU) 111, a memory control circuit 112, a memory buffer 113, a data classification circuit 114, and an error checking and correcting (ECC) circuit 115. The CPU 111 is coupled to the host 10 through a communication interface. According to a design requirement, the communication interface includes a small computer system interface (SCSI), a serial attached SCSI (SAS), an enhanced small disk interface (ESDI), a serial advanced technology attachment (SATA) interface, a peripheral component interconnect express (PCI-express) interface, an integrated drive electronics (IDE) interface, a universal serial bus (USB), a thunderbolt interface or other interface. The interface structure between the host 10 and the NVM apparatus 100 is not limited by the present embodiment.

When the host 10 sends the write command, the data to be written can be temporarily stored in the memory buffer 113, and the CPU 111 may convert/decode the write command (including the logical address) of the host 10 into a corresponding internal control signal (including a physical address of the NVM 120), and provide the internal control signal to the memory control circuit 112 and/or the memory buffer 113. The memory buffer 113 is, for example, a dynamic random access memory (DRAM), a static random access memory (SRAM) or other volatile memory. The ECC circuit 115 may execute an ECC algorithm to encode the data temporarily stored in the memory buffer 113 into a codeword. In some embodiments, the ECC circuit 115 may execute a Bose-Chaudhuri-Hocquengh code algorithm, a low density parity check (LDPC) code algorithm or other ECC algorithm. According to the internal control signal, the memory control circuit 112 may address/control the NVM 120 to write the codeword into the NVM 120.

When the host 10 sends a read command, the CPU 111 may convert/decode the read command (including a logical address) of the host 10 into a corresponding internal control signal (including a physical address of the NVM 120). According to the internal control signal, the memory control circuit 112 may address/control the NVM 120 to read the codeword from the NVM 120. The ECC circuit 115 may execute the ECC algorithm to decode the codeword into data, and temporarily store the decoded data into the memory buffer 113. Then, the CPU 111 may transmit the data temporarily stored in the memory buffer 113 to the host 10.

Figure 2:
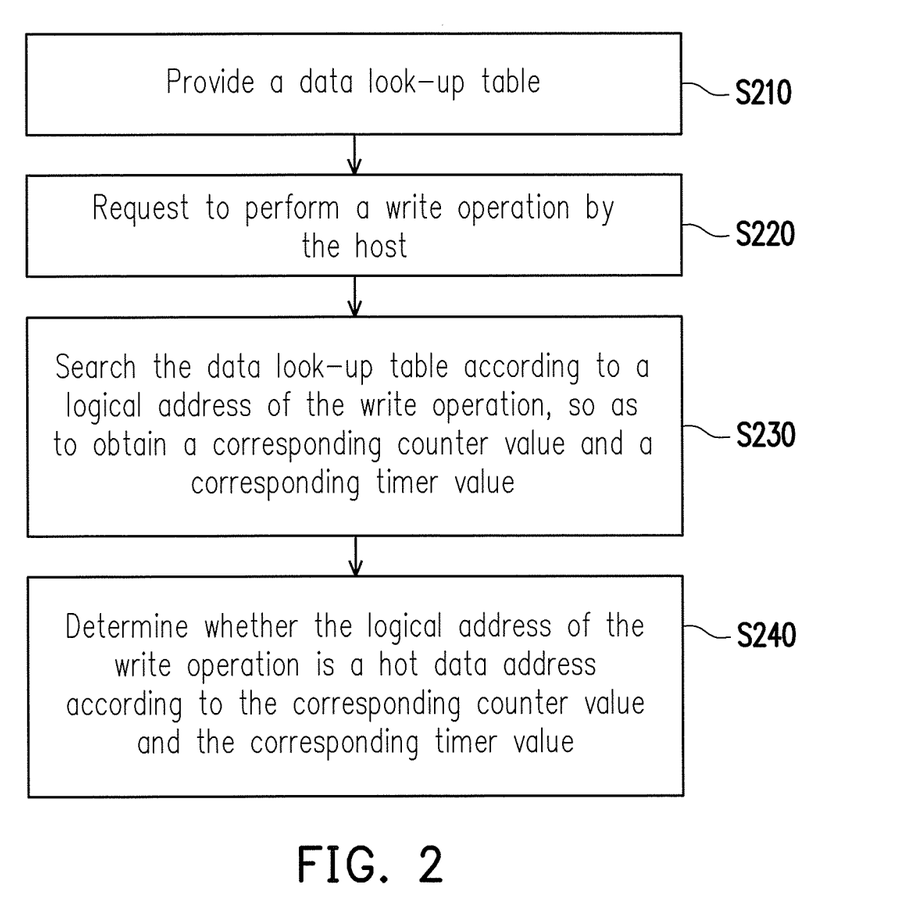
FIG. 2 is a flowchart illustrating an address classification method according to an embodiment of the invention.

FIG. 2 is a flowchart illustrating an address classification method according to an embodiment of the invention. Referring to FIG. 1 and FIG. 2, in step S210, the data classification circuit 114 provides a data look-up table, where the data look-up table may cache one set or a plurality sets of data entry information to identify the hot data, and the data look-up table includes a plurality of data entries, each of the data entries includes a logical address information, a counter value and a timer value. In some embodiments, the logical address information can be a logical block address (LBA) or other logical address. The CPU 111 may directly use the LBA of the write command of the host 10 to search the data entry with the same LBA from the data look-up table. In some other embodiments, the logical address information can be a unique identification code. The CPU 111 may convert the logical address of the write command of the host 10 into a corresponding identification code, and uses the corresponding identification code to search the data entry with the same identification code from the data look-up table.

After the host 10 sends the write command (step S220), the CPU 110 searches the data look-up data of the data classification circuit 114 according to the logical address of the write command, so as to obtain a corresponding data entry (step S230). The CPU 111 may obtain a corresponding counter value and a corresponding timer value from the corresponding data entry. The counter value is used for tracking data frequency information of a certain logical address, i.e. a write frequency of the logical address. The timer value is used for tracking whether data of a certain logical address is accessed recently, i.e. whether data of the logical address is updated within a present time window. Therefore, in step S240, the controller 111 determines whether the logical address of the write command of the host 10 is a hot data address based on the corresponding counter value and the corresponding timer value.

Figure 3:
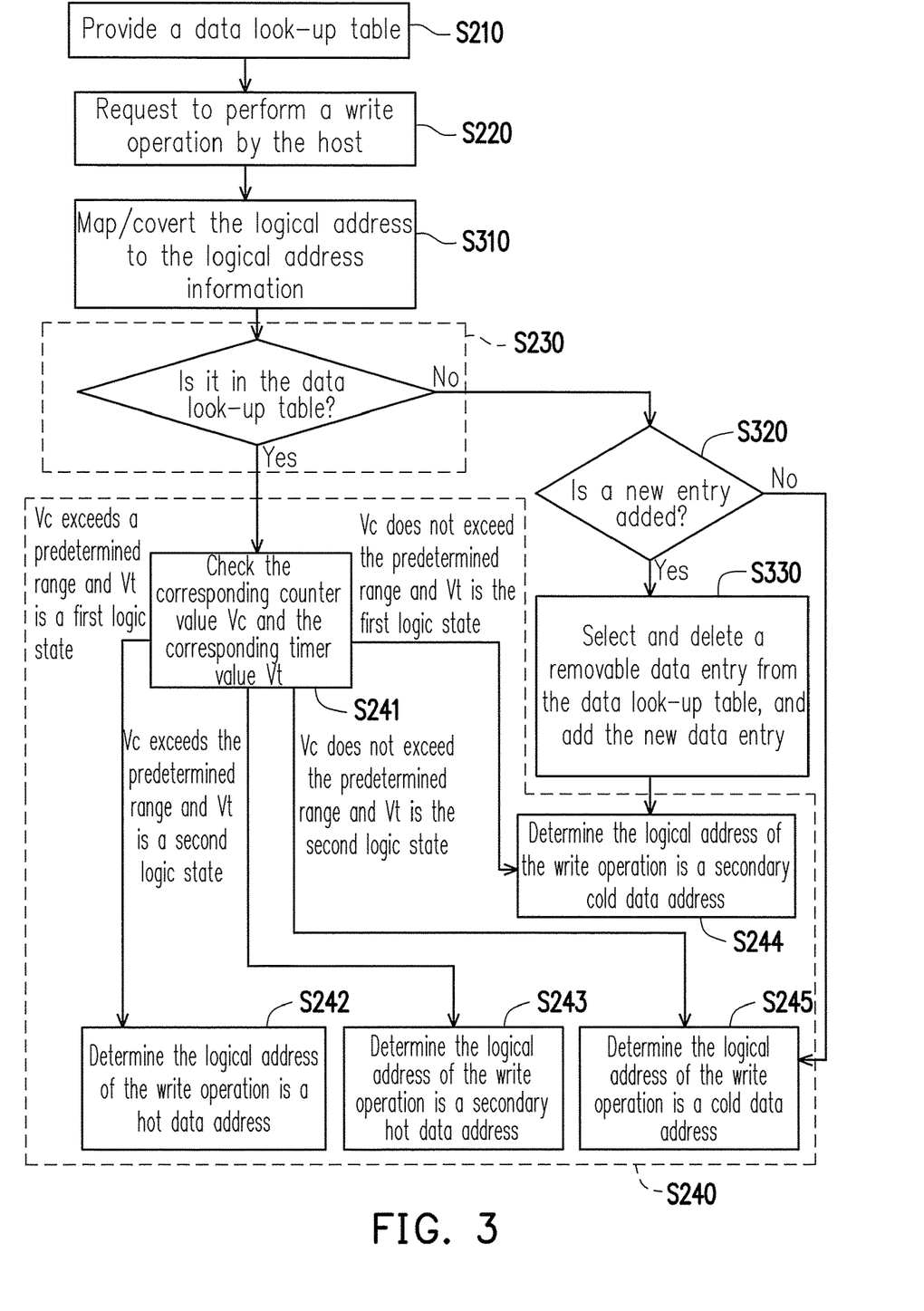
FIG. 3 is a flowchart illustrating an address classification method according to another embodiment of the invention.

FIG. 3 is a flowchart illustrating an address classification method according to another embodiment of the invention. The step S210, S220, S230 and the step S240 shown in FIG. 3 can be deduced according to related description of the embodiment of FIG. 2, and details thereof are not repeated. Referring to FIG. 1 and FIG. 3, after the host 10 sends the write command (the step S220), the CPU 111 may map/convert a LBA of the write command to the logical address information (step S310). For example, the LBA of the write command can be mapped/converted to a corresponding identification code, and the CPU 111 may use the corresponding identification code to search the data entry with the same identification code from the data look-up table of the data classification circuit 114. The operation of "mapping the LBA of the write command to the corresponding identification code" can be implemented through multi-level hash functions or other transform function, so as to reduce a search burden.

In the step S230, the CPU 111 may search the data look-up table of the data classification circuit 114 according to the logical address information (for example, the identification code) of the step S310, so as to determine whether the data look-up table includes the corresponding data entry having the logical address information matching the logical address of the write command of the host 10. If the data look-up table includes the corresponding data entry having the logical address information matching the logical address of the write command of the host 10, the CPU 111 may obtain the corresponding data entry in the step S230, so as to obtain a corresponding counter value Vc and a corresponding timer value Vt from the corresponding data entry.

Besides, in the step S230, the CPU 111 may further update the corresponding counter value Vc and the corresponding timer value Vt according to the logical address of the write command of the host 10. When the logical address information of one corresponding data entry in the data look-up table matches the logical address of the write command of the host 10, the data classification circuit 114 may add the corresponding counter value Vc of the corresponding data entry by one to track the data write frequency, and set the corresponding timer value Vt of the corresponding data entry to a first logic state (for example, logic 1) to represent a recent access.

In the embodiment of FIG. 3, the step S240 includes sub steps S241, S242, S243, S244 and S245. If the determination result of the step S230 represents that the data look-up table includes the corresponding data entry having the logical address information matching the logical address of the write command of the host 10, the CPU 111 may execute the step S241. In the step S241, the CPU 111 may check the corresponding counter value Vc and the corresponding timer value Vt found from the data look-up table. When the corresponding counter value Vc exceeds a predetermined range and the corresponding timer value Vt is in the first logic state, the CPU 111 determines the logical address of the write command of the host 10 to be the hot data address (step S242). According to the design requirement, the predetermined range can be a single boundary range or a double boundary range. For example, in some embodiments, in the step S241, it is checked whether the corresponding counter value Vc is greater than a threshold Th1 (if the corresponding counter value Vc is greater than the threshold Th1, it represents that the corresponding counter value Vc exceeds the predetermined range), where the threshold Th1 can be determined according to an actual design requirement. In some other embodiments, in the step S241, it can be checked whether the corresponding counter value Vc is smaller than a threshold Th2 (if the corresponding counter value Vc is smaller than the threshold Th2, it represents that the corresponding counter value Vc exceeds the predetermined range), where the threshold Th2 can be determined according to an actual design requirement. According to the design requirement, the first logic state can be logic 1 or logic 0. For example, in some embodiments, in the step S241, it can be checked whether the corresponding timer value Vt is logic 1, and the logic 1 represents that data of the corresponding logical address is ever updated within the present time window. In some other embodiments, in the step S241, it can be checked whether the corresponding timer value Vt is logic 0, and the logic 0 represents that data of the corresponding logical address is ever updated within the present time window.

When the corresponding counter value Vc exceeds the predetermined range and the corresponding timer value Vt is in a second logic state, the CPU 111 determines the logical address of the write command of the host 10 to be a secondary hot data address (step S243). When the corresponding counter value Vc does not exceed the predetermined range and the corresponding timer value Vt is in the first logic state, the CPU 111 determines the logical address of the write command of the host 10 to be a secondary cold data address (step S244). When the corresponding counter value Vc does not exceed the predetermined range and the corresponding timer value Vt is in the second logic state, the CPU 111 determines the logical address of the write command of the host 10 to be a cold data address (step S245).

In other embodiments, if the determination result of the step S230 represents that the data look-up table of the data classification circuit 114 does not include the corresponding data entry having the logical address information matching the logical address of the write command of the host 10, the CPU 111 may unconditionally add a new data entry corresponding to the logical address of the write command of the host 10 to the data look-up table of the data classification circuit 114, where the logical address information of the new data entry matches the logical address of the write command, the counter value of the new data entry is set to 1, and the timer value of the new data entry is set to the first logic state (for example, logic 1). In the embodiment of FIG. 3, if the determination result of the step S230 represents that the data look-up table of the data classification circuit 114 does not include the corresponding data entry having the logical address information matching the logical address of the write command of the host 10, the CPU 111 may execute the step S320.

In the step S320, it is determined whether to add the new data entry corresponding to the logical address of the write command of the host 10 to the data look-up table of the data classification circuit 114. For example, the CPU 111 determines whether to add the new data entry corresponding to the logical address of the write command of the host 10 to the data look-up table of the data classification circuit 114 according to a random value or a pseudo random value, where the logical address information of the new data entry matches the logical address of the write command, the counter value of the new data entry is set to 1, and the timer value of the new data entry is set to the first logic state (for example, logic 1). For example, if the pseudo random value is greater than a threshold Th3, it represents that it is required to add the new data entry to the data look-up table. If the pseudo random value is smaller than the threshold Th3, it represents that it is not required to add the new data entry to the data look-up table. If the determination result of the step S320 represents that it is not required to add the new data entry to the data look-up table of the data classification circuit 114, the CPU 111 may determine the logical address of the write command of the host 10 to be the cold data address (step S245). If the determination result of the step S320 represents that it is required to add the new data entry to the data look-up table of the data classification circuit 114, the controller 110 executes the step S330.

In the step S320, when it is determined to add the new data entry, since a capacity of the data look-up table is limited, one data entry stored in the data look-up table is probably removed. In the step S330, the new data entry can be added to the data look-up table of the data classification circuit 114. When the controller 110 determines to add the new data entry corresponding to the logical address of the write command to the data look-up table of the data classification circuit 114, and the data look-up table is full, in the step S330, the data classification circuit 114 may select and delete one removable data entry from the data entries in the data look-up table, where the counter value of the removable data entry does not exceed the predetermined range (for example, not greater than the threshold Th1), and the timer value is the second logic state (for example, logic 0). After the step S330 is completed, the CPU 111 may determine the logical address of the write command of the host 10 to be the secondary cold data address (step S244).

In some other embodiments, the data classification circuit 114 may maintain a removing candidate list. The data classification circuit 114 may add all data entries in the data look-up table that have the counter values not exceeding the predetermined range and the timer values being the second logic state to the removing candidate list. The counter value not exceeding the predetermined range (for example, not greater than the threshold Th1) and the timer value being the second logic state (for example, logic 0) represents that the logical address corresponding to the data entry has a lower access frequency, and the logical address corresponding to the data entry has not been accessed for a period of time recently. In order to reduce a search burden, the hardware/firmware may maintain the removing candidate list during a runtime. When the controller 110 determines to add the new data entry corresponding to the logical address of the write command to the data look-up table in the step S320, but the data look-up table is full, in the step S330, the data classification circuit 114 may select a removable data entry from the removing candidate list, and then the data classification circuit 114 may remove the removable data entry from the data look-up table and the removing candidate list. It should be noted that when the logical address information of one corresponding data entry in the removing candidate list matches the logical address of the write command of the host 10, the data classification circuit 114 may remove the corresponding data entry from the removing candidate list, and add the corresponding counter value of the corresponding data entry in the data look-up table by one, and set the corresponding timer value of the corresponding data entry in the data look-up table to the first logic state (for example, logic 1).

In order to obtain a write workload variation at any time, regarding all of the data entries stored in the data look-up table, the data classification circuit 114 may respectively divide the counter values of the data entries by a parameter f, and reset the timer values of the data entries to the second logic state (for example, logic 0) every a predetermined time. The above mechanism may obtain a relative load variation and avoid a problem of counter overflow.

Figure 4:
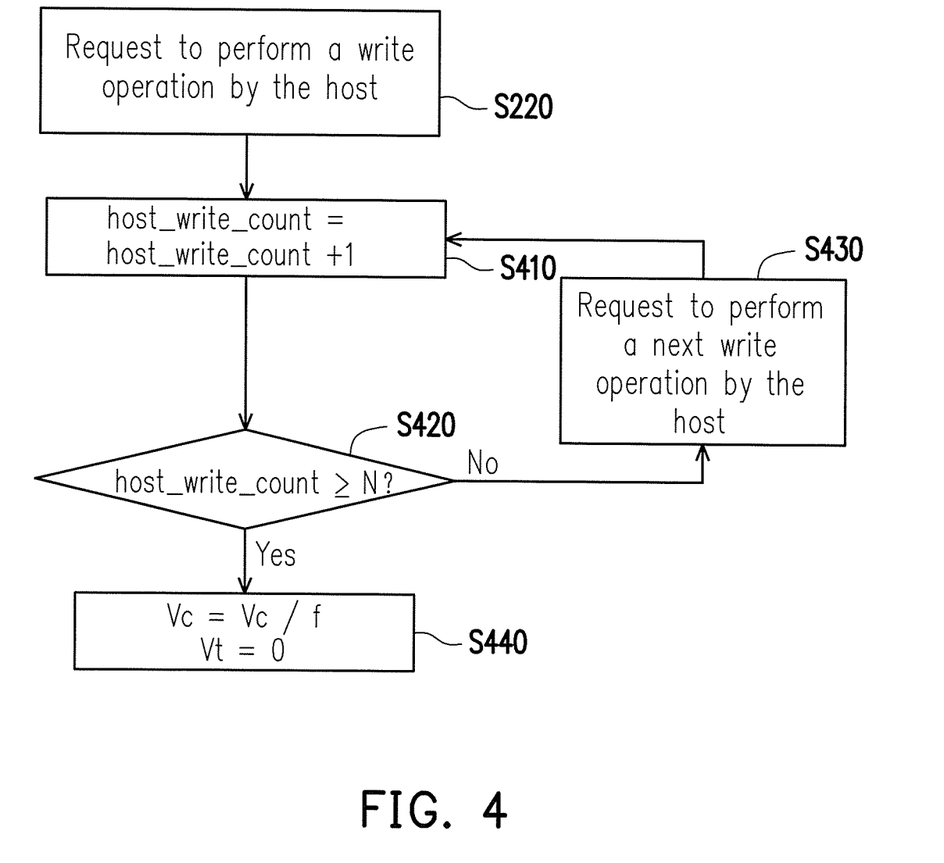
FIG. 4 is a flowchart of refresh of a data look-up table according to an embodiment of the invention.

For example, FIG. 4 is a flowchart of refresh of the data look-up table according to an embodiment of the invention. Referring to FIG. 1 and FIG. 4, the data classification circuit 114 may use a host command counter value host_write_count to count the times that the host 10 sends the write command. After the host 10 sends a write command (the step S220), the data classification circuit 114 may add the host command counter value host_write_count by one (step S410). In step S420, the data classification circuit 114 may determine whether the host command counter value host_write_count is greater than or equal to a threshold N, where the threshold N can be determined according to an actual design requirement. When the determination result of the step S420 represents that the host command counter value host_write_count is smaller than the threshold N, the data classification circuit 114 may wait the host 10 to send a next write command (step S430). After the host 10 sends the next write command (the step S430), the data classification circuit 114 returns to the step S410 to add the host command counter value host_write_count by one.

When the determination result of the step S420 represents that the host command counter value host_write_count is greater than or equal to the threshold N, the data classification circuit 114 may execute a step S440. In the step S440, the data classification circuit 114 may respectively divide the counter values Vc of each of the data entries by a parameter f, and reset the timer values Vt of each of the data entries to the second logic state (for example, logic 0). The parameter f can be determined according to an actual design requirement. For example, the parameter f can be 2 or other real number. Therefore, in case of every N host write requests, the counter values Vc of each of the data entries are respectively divided by f, and the timer values Vt of each of the data entries is reset to the second logic state. For example, regarding every 8192 host write commands, all of the counter values Vc are divided by f=2, and all of the timer values Vt are reset to logic 0.

The refresh flow of the data look-up table of FIG. 4 is an example. In other embodiments, the data entries in the data look-up table can be refreshed asynchronously. For example, when the logical address information of a corresponding data entry in the data look-up table matches the logical address of the write command of the host 10, the data classification circuit 114 may start a timing operation to the corresponding data entry. When a timing result of the timing operation reaches a certain predetermined time (the predetermined time can be determined according to the design requirement), the data classification circuit 114 may stop the timing operation, and divide the corresponding counter value Vc of the corresponding data entry by the parameter f, and reset the corresponding timer value Vt of the corresponding data entry to the second logic state (for example, logic 0). Regarding different data entries, start time points of the timing operations are generally different. Therefore, the data entries in the data look-up table can be refreshed asynchronously. It should be noted that before the timing result of the timing operation reaches the predetermined time, if the logical address of another write command of the host 10 matches the logical address information of the same corresponding data entry, the data classification circuit 114 may reset the timing result of the timing operation of the corresponding data entry (retiming), and add the corresponding counter value Vc of the corresponding data entry by one, and set the corresponding timer value Vt of the corresponding data entry to the first logic state (for example, logic 1).

It should be noted that in different application occasions, related functions of the controller 110, the CPU 111, the memory control circuit 112, the data classification circuit 114 and/or the ECC circuit 115 can be implemented as software, firmware or hardware by using general programming languages (for example, C or C++), hardware description languages, for example, Verilog HDL or VHDL) or other suitable programming languages. The software (or firmware) capable of executing the related function can be stored in any known computer-accessible media, for example, magnetic tapes, semiconductor memories, magnetic disks or compact disks, for example, CD-ROM or DVD-ROM, or the software (or firmware) can be transmitted through the Internet, wired communication, wireless communication or other communication medium. The software (or firmware) can be stored in an accessible medium of a computer to facilitate a processor of the computer to access/execute programming codes of the software (or firmware). Moreover, the apparatus and the method of the invention can be implemented through a combination of hardware and software.

For example, in another embodiment, the data classification circuit 114 includes a dynamic random access memory (DRAM), a static random access memory (SRAM) or other volatile memory. The data classification circuit 114 is used for storing the data look-up table. The aforementioned address classification method can be executed by the CPU 111. During the process that the CPU 111 executes the aforementioned address classification method, the CPU 111 may access/manage the data look-up table stored in the data classification circuit 114.

Figure 5:
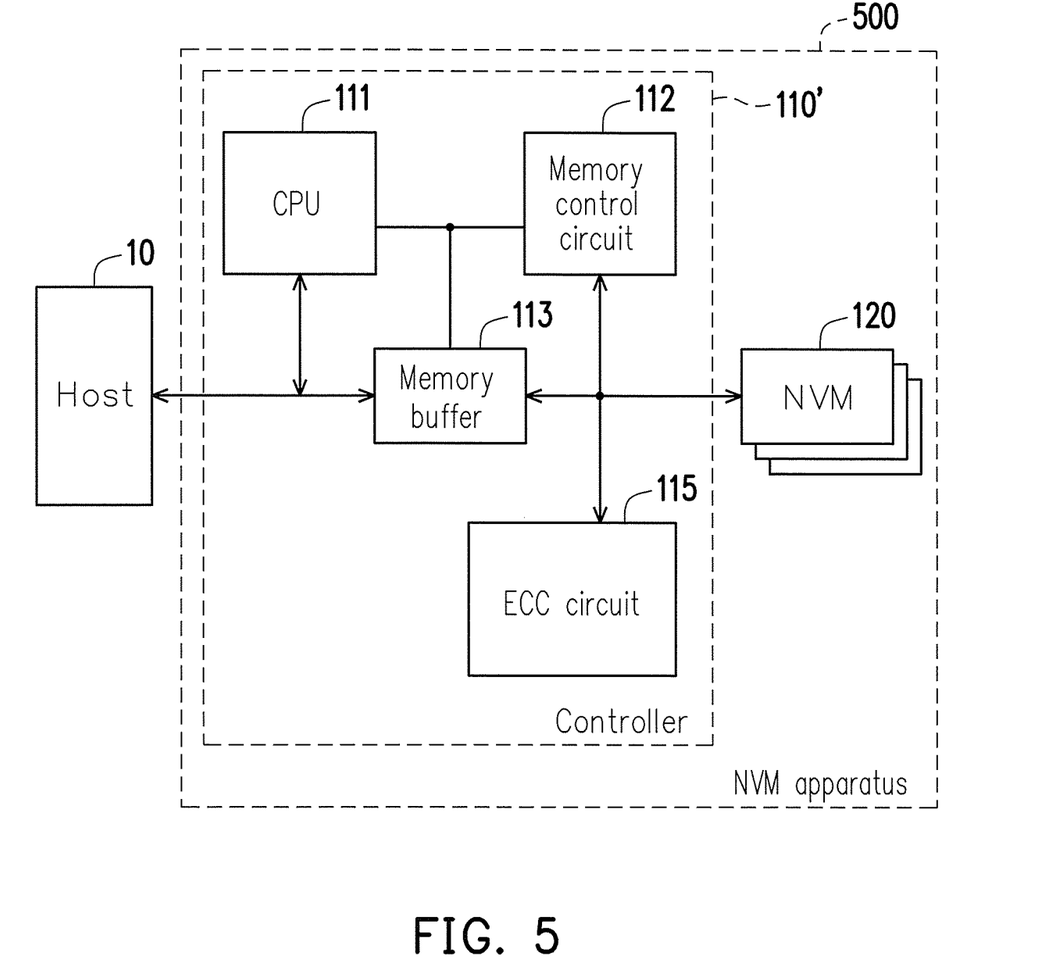
FIG. 5 is a circuit block schematic diagram of a NVM apparatus according to another embodiment of the invention.

For example, FIG. 5 is a circuit block schematic diagram of a NVM apparatus 500 according to another embodiment of the invention. The NVM apparatus 500 includes a controller 110' and the NVM 120. In the embodiment of FIG. 5, the controller 110' includes the CPU 111, the memory control circuit 112, the memory buffer 113 and the ECC circuit 115. The NVM apparatus 500, the controller 110', the NVM 120, the CPU 111, the memory control circuit 112, the memory buffer 113 and the ECC circuit 115 of FIG. 5 can be deduced by referring to related description of the NVM apparatus 100, the controller 110, the NVM 120, the CPU 111, the memory control circuit 112, the memory buffer 113 and the ECC circuit 115 of FIG. 1, and details thereof are not repeated. In the embodiment of FIG. 5, the data classification circuit 114 is omitted, and the function of the data classification circuit 114 can be implemented in the CPU 111 through a firmware and/or software manner. Therefore, related descriptions of FIG. 3 and FIG. 4 are also adapted to the NVM apparatus 500 of FIG. 5.

In summary, the NVM apparatus and the address classification method provided by the embodiments of the invention adopt a data look-up table to classify the cold and hot data of the host 10. The data look-up table includes a plurality of data entries, and each of the data entries includes logical address information, a counter value Vc and a timer value Vt. The aforementioned embodiments disclose an on-the-fly approach, which is adapted obtain a write workload variation according to a write frequency (the counter value Vc) of data LBA and a recent access status (the timer value Vt). The corresponding counter value and the corresponding timer value can be found from the data look-up table according to the logical address of the write command. The controller may check the corresponding counter value and the corresponding timer value to determine whether the logical address of the write command is the hot data address.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A non-volatile memory apparatus, comprising:
a non-volatile memory; and
a controller, coupled to the non-volatile memory, and configured to perform an address classification to determine whether a logical address of a write command coming from a host is a hot data address, and accessing the non-volatile memory according to the write command, wherein the address classification performed by the controller comprises:
providing a data look-up table, wherein the data look-up table comprises a plurality of data entries, each of the data entries comprises a logical address information corresponding to the logical address, a counter value corresponding to the logical address and a timer value corresponding to the logical address, wherein the counter value is configured to track write frequency of the logical address;
searching the data look-up table by the controller and obtaining a corresponding counter value and a corresponding timer value from the data look-up table based on the logical address of the write command;
determining whether the logical address of the write command is the hot data address by the controller based on the corresponding counter value and the corresponding timer value; and
adding the corresponding counter value of a corresponding data entry by one, and setting the corresponding timer value of the corresponding data entry to a first logic state when the logical address information of the corresponding data entry in the data look-up table matches the logical address of the write command.

2. The non-volatile memory apparatus as claimed in claim 1, wherein the controller determines the logical address of the write command to be the hot data address when the corresponding counter value exceeds a predetermined range and the corresponding timer value is a first logic state, and the controller determines the logical address of the write command to be a cold data address when the corresponding counter value does not exceed the predetermined range and the corresponding timer value is a second logic state.

3. The non-volatile memory apparatus as claimed in claim 2, wherein the controller determines the logical address of the write command to be a secondary hot data address when the corresponding counter value exceeds the predetermined range and the corresponding timer value is the second logic state, and the controller determines the logical address of the write command to be a secondary cold data address when the corresponding counter value does not exceed the predetermined range and the corresponding timer value is the first logic state.

4. The non-volatile memory apparatus as claimed in claim 1, wherein the controller respectively divides the counter values of the data entries by a parameter every a predetermined time, and resets the timer values of the data entries to a second logic state.

5. The non-volatile memory apparatus as claimed in claim 1, wherein the controller starts a timing operation to the corresponding data entry when the logical address information of the corresponding data entry matches the logical address of the write command; and when a timing result of the timing operation reaches a predetermined time, the controller stops the timing operation, and divides the corresponding counter value of the corresponding data entry by a parameter, and resets the corresponding timer value of the corresponding data entry to a second logic state.

6. The non-volatile memory apparatus as claimed in claim 5, wherein when a logical address of another write command coming from the host matches the logical address information of the corresponding data entry before the timing result of the timing operation reaches the predetermined time, the controller resets the timing result of the timing operation of the corresponding data entry, adds the corresponding counter value of the corresponding data entry by one, and sets the corresponding timer value of the corresponding data entry to the first logic state.

7. The non-volatile memory apparatus as claimed in claim 1, wherein the controller adds a new data entry corresponding to the logical address of the write command to the data look-up table when the logical address information of all of the data entries in the data look-up table is not matched to the logical address of the write command, wherein the logical address information of the new data entry matches the logical address of the write command, the counter value of the new data entry is set to 1, and the timer value of the new data entry is set to a first logic state.

8. The non-volatile memory apparatus as claimed in claim 1, wherein the controller determines whether to add a new data entry corresponding to the logical address of the write command to the data look-up table according to a random value or a pseudo random value when the logical address information of all of the data entries in the data look-up table is not matched to the logical address of the write command, wherein the logical address information of the new data entry matches the logical address of the write command, the counter value of the new data entry is set to 1, and the timer value of the new data entry is set to a first logic state.

9. The non-volatile memory apparatus as claimed in claim 1, wherein the controller selects and deletes a removable data entry from the data entries of the data look-up table when the controller determines to add a new data entry corresponding to the logical address of the write command to the data look-up table and the data look-up table is full, wherein the counter value of the removable data entry does not exceed a predetermined range, and the timer value of the removable data entry is a second logic state.

10. The non-volatile memory apparatus as claimed in claim 1, wherein the controller adds all data entries in the data look-up table that have the counter values not exceeding a predetermined range and the timer values being a second logic state to a removing candidate list, and when the controller determines to add a new data entry corresponding to the logical address of the write command to the data look-up table and the data look-up table is full, the controller selects a removable data entry from the removing candidate list, and removes the removable data entry from the data look-up table and the removing candidate list.

11. The non-volatile memory apparatus as claimed in claim 10, wherein when the logical address information of a corresponding data entry in the removing candidate list matches the logical address of the write command, the controller removes the corresponding data entry from the removing candidate list, adds the corresponding counter value of the corresponding data entry in the data look-up table by one, and sets the corresponding timer value of the corresponding data entry in the data look-up table to a first logic state.

12. An address classification method of a non-volatile memory apparatus, adapted to determine whether a logical address of a write command coming from a host is a hot data address, the address classification method comprising:
providing a data look-up table, wherein the data look-up table comprises a plurality of data entries, each of the data entries comprises a logical address information corresponding to the logical address, a counter value corresponding to the logical address and a timer value corresponding to the logical address, wherein the counter value is configured to track write frequency of the logical address;
searching the data look-up table by a controller and obtaining a corresponding counter value and a corresponding timer value from the data look-up table based on the logical address of the write command;
determining whether the logical address of the write command is a hot data address by the controller based on the corresponding counter value and the corresponding timer value;
adding the corresponding counter value of a corresponding data entry by one by the controller when the logical address information of the corresponding data entry in the data look-up table matches the logical address of the write command; and
setting the corresponding timer value of the corresponding data entry to a first logic state by the controller when the logical address information of the corresponding data entry in the data look-up table matches the logical address of the write command.

13. The address classification method of the non-volatile memory apparatus as claimed in claim 12, wherein the step of determining whether the logical address of the write command is the hot data address comprises:
determining the logical address of the write command to be the hot data address by the controller when the corresponding counter value exceeds a predetermined range and the corresponding timer value is a first logic state; and
determining the logical address of the write command to be a cold data address by the controller when the corresponding counter value does not exceed the predetermined range and the corresponding timer value is a second logic state.

14. The address classification method of the non-volatile memory apparatus as claimed in claim 13, wherein the step of determining whether the logical address of the write command is the hot data address further comprises:
determining the logical address of the write command to be a secondary hot data address by the controller when the corresponding counter value exceeds the predetermined range and the corresponding timer value is the second logic state; and
determining the logical address of the write command to be a secondary cold data address by the controller when the corresponding counter value does not exceed the predetermined range and the corresponding timer value is the first logic state.

15. The address classification method of the non-volatile memory apparatus as claimed in claim 12, further comprising:
respectively dividing the counter values of the data entries by a parameter by the controller every a predetermined time, and resetting the timer values of the data entries to a second logic state every the predetermined time.

16. The address classification method of the non-volatile memory apparatus as claimed in claim 12, further comprising:
starting a timing operation to the corresponding data entry by the controller when the logical address information of the corresponding data entry matches the logical address of the write command; and
stopping the timing operation by the controller when a timing result of the timing operation reaches a predetermined time, and dividing the corresponding counter value of the corresponding data entry by a parameter, and resetting the corresponding timer value of the corresponding data entry to a second logic state.

17. The address classification method of the non-volatile memory apparatus as claimed in claim 16, further comprising:

resetting the timing result of the timing operation of the corresponding data entry by the controller when a logical address of another write command coming from the host matches the logical address information of the corresponding data entry before the timing result of the timing operation reaches the predetermined time, adding the corresponding counter value of the corresponding data entry by one, and setting the corresponding timer value of the corresponding data entry to the first logic state.

18. The address classification method of the non-volatile memory apparatus as claimed in claim 12, further comprising:

adding a new data entry corresponding to the logical address of the write command to the data look-up table by the controller when the logical address information of all of the data entries in the data look-up table is not matched to the logical address of the write command, wherein the logical address information of the new data entry matches the logical address of the write command, the counter value of the new data entry is set to 1, and the timer value of the new data entry is set to a first logic state.

19. The address classification method of the non-volatile memory apparatus as claimed in claim 12, further comprising:

determining whether to add a new data entry corresponding to the logical address of the write command to the data look-up table by the controller according to a random value or a pseudo random value when the logical address information of all of the data entries in the data look-up table is not matched to the logical address of the write command, wherein the logical address information of the new data entry matches the logical address of the write command, the counter value of the new data entry is set to 1, and the timer value of the new data entry is set to a first logic state.

20. The address classification method of the non-volatile memory apparatus as claimed in claim 12, further comprising:

selecting and deleting a removable data entry from the data entries of the data look-up table by the controller when the controller determines to add a new data entry corresponding to the logical address of the write command to the data look-up table and the data look-up table is full, wherein the counter value of the removable data entry does not exceed the predetermined range, and the timer value of the removable data entry is a second logic state.

21. The address classification method of the non-volatile memory apparatus as claimed in claim 12, further comprising:

adding all data entries in the data look-up table that have the counter values not exceeding the predetermined range and the timer values being a second logic state to a removing candidate list by the controller; and selecting a removable data entry from the removing candidate list by the controller when the controller determines to add a new data entry corresponding to the logical address of the write command to the data look-up table and the data look-up table is full, and removing the removable data entry from the data look-up table and the removing candidate list.

22. The address classification method of the non-volatile memory apparatus as claimed in claim 21, further comprising:

removing a corresponding data entry from the removing candidate list by the controller when the logical address information of the corresponding data entry in the removing candidate list matches the logical address of the write command, adding the corresponding counter value of the corresponding data entry in the data look-up table by one, and setting the corresponding timer value of the corresponding data entry in the data look-up table to a first logic state.

* * * * *